US006967913B2

(12) United States Patent  
Okamoto et al.

(10) Patent No.: US 6,967,913 B2  
(45) Date of Patent: Nov. 22, 2005

(54) INFORMATION PROCESSING METHOD FOR ACHIEVING OPTIMIZATION OF RECORDING VELOCITY

(75) Inventors: Akihiko Okamoto, Kanagawa (JP); Yoshiyuki Ishiyama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 567 days.

(21) Appl. No.: 10/163,302

(22) Filed: Jun. 7, 2002

(65) Prior Publication Data

US 2002/0191506 A1   Dec. 19, 2002

(30) Foreign Application Priority Data

Jun. 15, 2001  (JP)  .............................. 2001-181199

(51) Int. Cl.⁷ .............................................. G11B 5/09
(52) U.S. Cl. .............................. 369/47.44; 369/47.38; 369/53.2; 369/53.3
(58) Field of Search .................... 369/47.23, 47.24, 369/47.3, 47.39, 47.43, 47.44, 47.52, 53.2, 369/53.23, 53.28, 53.3, 53.37, 47.4, 47.38, 369/47.41, 47.45, 53.42, 53.43, 53.44, 53.55

(56) References Cited

U.S. PATENT DOCUMENTS

| 5,701,284 | A | * | 12/1997 | Lee | .......................... | 369/47.44 |
| 5,721,718 | A | * | 2/1998 | Hwang | ..................... | 369/53.23 |
| 5,737,287 | A | * | 4/1998 | Lee | .......................... | 369/44.26 |
| 5,903,531 | A | * | 5/1999 | Satoh et al. | .............. | 369/44.29 |
| 6,172,952 | B1 | * | 1/2001 | Inokuchi et al. | ......... | 369/44.32 |
| 6,195,321 | B1 | * | 2/2001 | Takamine et al. | ........ | 369/47.44 |
| 6,304,535 | B1 | * | 10/2001 | Magome et al. | ........... | 369/53.2 |
| 6,369,973 | B1 | * | 4/2002 | Mushika et al. | ......... | 360/78.07 |
| 6,545,956 | B2 | * | 4/2003 | Shimamura et al. | ..... | 369/44.27 |

FOREIGN PATENT DOCUMENTS

| JP | 7-93873 | 4/1995 |
| JP | 10-49990 | 2/1998 |
| JP | 11-66726 | 3/1999 |

* cited by examiner

Primary Examiner—Thang V. Tran  
(74) Attorney, Agent, or Firm—Dickstein Shapiro Morin & Oshinsky LLP (57) ABSTRACT

An optical disk recording method comprising steps of a) performing recording onto the optical disk with a ZCLV method by using zone parameter storage means for storing at least one zone division time and CLV of each zone in a track formed on the optical disk, as zone parameters, for each of a plurality of recording modes and optical disk type determination means for determining the type of the optical disk before recording; b) performing optimization of the recording velocity by detecting, before recording, servo signal fluctuation by accessing the optical disk, by determining maximum recording velocity defined by the speed of a rotational motor rotating the optical disk, and by calculating a changing point of the recording velocity; and c) limiting the speed of the rotational motor, when the servo signal fluctuation at the surface of the optical disk exceeds a reference level and determining the relation between the zone division time and the CLV of each zone.

17 Claims, 7 Drawing Sheets

| MODE | RECORDING VELOCITY | | | DIVISION POSITION | |
|---|---|---|---|---|---|
| | s1 | s2 | s3 | t1 | t2 |
| 1 | 8 | 8 | 8 | | |
| 2 | 8 | 12 | 12 | A | |
| 3 | 12 | 16 | 20 | B | C |
| 4 | 12 | 12 | 12 | | |
| 5 | 16 | 16 | 20 | | D |

FIG.5

| DISK TYPE | RECORDING MODE |
|---|---|
| A CYANINE | 5 |
| A PHTHALO | 4 |
| C CYANINE | 1 |
| D PHTHALO | 1 |
| E PHTHALO | 3 |
| F PHTHALO | 2 |

FIG.6

| DISK TYPE | MAX RECORDING VELOCITY |
|---|---|
| A CYANINE | 20 |
| A PHTHALO | 12 |
| C CYANINE | 8 |
| D PHTHALO | 8 |
| E PHTHALO | 20 |
| F PHTHALO | 12 |

INFORMATION PROCESSING METHOD FOR ACHIEVING OPTIMIZATION OF RECORDING VELOCITY

BACKGROUND OF THE INVENTION

1. Field of the Invention

The present invention generally relates to an optical disk recording method, an information processing method, an optical disk device, an information processing device, and a controller usable in the optical disk device.

2. Description of the Related Art

In recent years, as an optical disk device recording information on an optical disk such as a CD-R is becoming more widely used as an exterior recording device of a personal computer, the demand for higher-speed recording is becoming very large.

The rotational speed of the optical disk increases when performing high-speed recording onto the optical disk. When the machine accuracy of the optical disk is poor, a problem such as track deviation wherein an optical spot recording information onto the optical disk deviates from a track due to side-runout and decentering is likely to occur. When the track deviation occurs during recording, the optical disk becomes useless and this imposes a critical problem.

For an optical disk such as a compact disk, a representative of which is a CD-R, density of recording data is identical in all surface areas of the optical disk. When linear velocity of the optical disk (tangential velocity at the location of the optical spot on the optical disk) performing recording/reading data on the optical disk is constant in the range of 1.2–1.4 m/s, channel bit rate of the data is 4.3218 Mbit/sec. Recording velocity under this condition is so-called equi-velocity or 1x velocity. A method of controlling the rotation of the optical disk so as to keep the linear velocity constant is called a Constant Linear Velocity (CLV) method. The optical disks such as the CDs adopt a format wherein the linear velocity is to be kept constant as mentioned above, thus CLV recording (recording using the CLV method) is performed. The recording is performed with a velocity Qf an integral multiple of reference 1x linear velocity (such as 1x, 2x, 4x, 8x, 12x, 16x, 20x, etc., where x is a scale factor).

When performing the CLV recording, the number of revolutions per minute at an inner periphery of the optical disk and at an outer periphery of the optical disk varies greatly. Needless to say, for the CLV method, the number of revolutions per minute while recording at the inner periphery of the optical disk is larger than the number of revolutions per minute while recording at the outer periphery of the optical disk. In order to prevent track deviation from occurring during recording, it is necessary to determine CLV (constant linear velocity used in the CLV method) so that track deviation will not occur at the innermost periphery of the optical disk where it rotates at maximum speed. Then, in this case, the number of revolutions per minute at the outer periphery of the optical disk has a margin for the track deviation, that is, the rotational speed is reduced.

Figure 1:
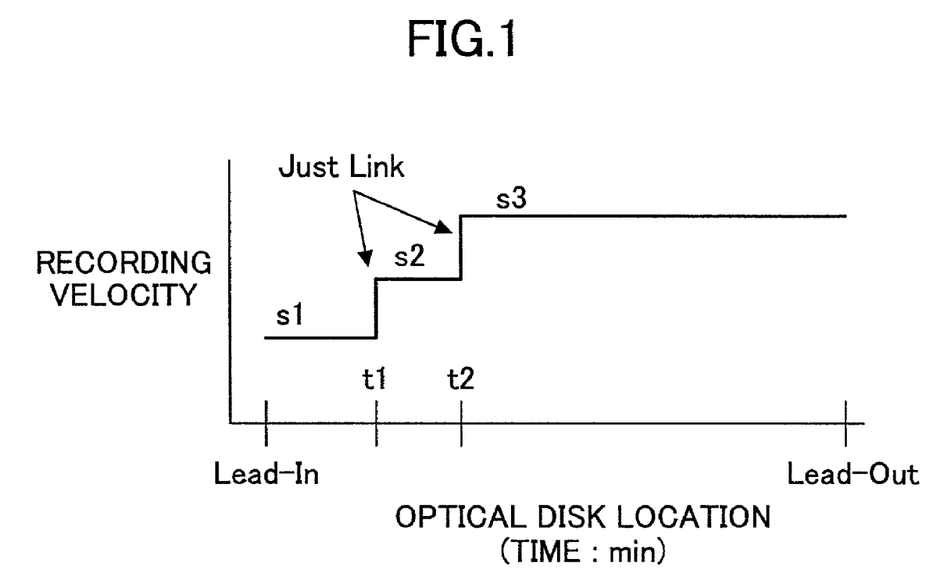
FIG. 1 shows a relation between location on an optical disk (time) and recording velocity in a ZCLV method.

There has been proposed so-called ZCLV (Zone CLV) method wherein the track of the optical disk is divided into a plurality of zones, such as an inner periphery, an intermediate periphery, and an outer periphery and the CLV of each zone is determined so that continuous recording is possible. This method realizes high-speed recording. FIG. 1 shows an example realizing ZCLV recording (recording using the ZCLV method). In FIG. 1, the horizontal axis represents a location (time) on the optical disk and the vertical axis represents recording velocity. In this example, the optical disk is divided into 3 zones (Lead-In to t1, t1 to t2, and t2 to Lead-Out) and the CLV of each zone is determined as s1, s2, and s3, respectively. At transition (t1, t2) of the zones, the continuity of the data is maintained by making use of the technique described in Japanese Laid-Open Patent Application No. 10-49990.

In Japanese Laid-Open Patent Application No. 7-93873, a ZCLV recording method for an optical disk already having divided zones is described. However, with this method, recording onto an optical disk comprising only a single spiral track, such as a CD-R disk, is not possible since divided zones are not provided.

Japanese Laid-Open Patent Application No. 11-66726 describes, as in JPA No. 7-93873, a ZCLV recording method for an optical disk already having divided zones. However, again with this method, recording onto an optical disk comprising only a single spiral track, such as a CD-R disk, is not possible since divided zones are not provided.

There has been also proposed an optical disk device that performs ZCLV recording by performing interruption and resumption of recording at any location on the optical disk, ensuring the continuity of the data, and increasing the CLV when resuming the recording.

Further, there have been proposed a method of determining zones for optimum recording for any type of optical disk, a method of determining recording velocity for each zone, and a method of determining recording power. These are all to describe specifically the method of performing ZCLV recording onto an optical disk.

In the above-mentioned ZCLV recording methods, parameters determined by several predetermined ZCLV recording modes are retrieved and correspondence is made between such parameters and each type of the optical disk. However, since it is not possible to set a flexible relation between velocity and time, there arises a phenomenon such as even in a case of an optical disk having a potential of recording at 20x velocity in one area, the recording velocity may be increased only up to 16x velocity when the area close to the outer periphery can only be recorded at 16x velocity.

Figure 2:
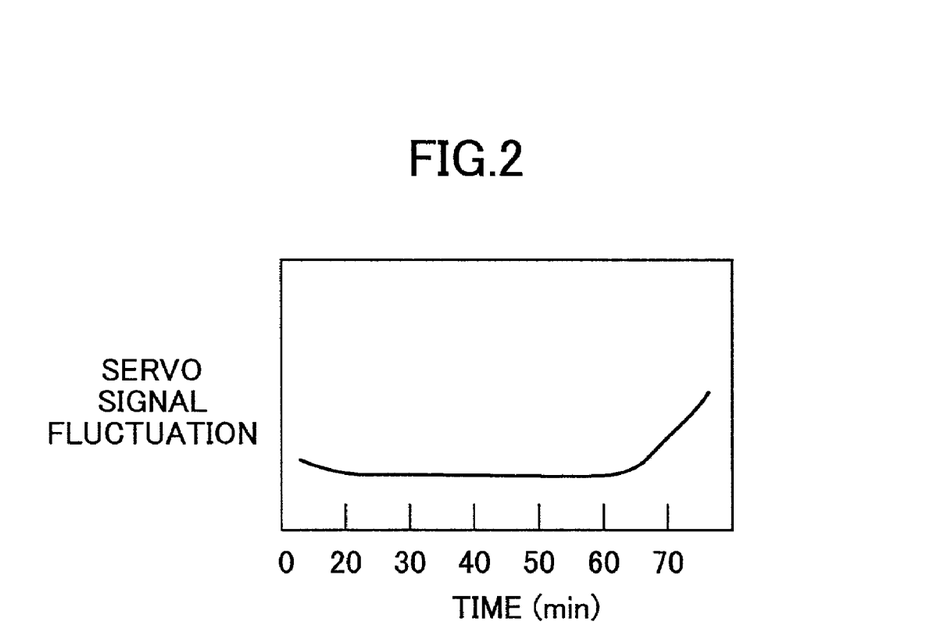
FIG. 2 shows a relation between recording area and fluctuation of a servo signal according to the first embodiment of the present invention.

For example, an optical disk may have a relation between recording area (recording time) and servo signal fluctuation as shown in FIG. 2, with the servo signal fluctuation increasing toward the outer periphery of the optical disk. In this example, even though the servo signal fluctuation at the intermediate periphery of the optical disk is less, the ZCLV recording mode is determined by taking into consideration the outer periphery of the optical disk where the servo signal fluctuation is large. Therefore, the maximum capable velocity of 20x may not be utilized. Thus, since the maximum recording velocity is determined adaptively for the area where the servo signal fluctuation is large, the potential of the optical disk is not fully taken advantage of.

Also in a case where the optical disk device itself determines the optimum recording velocity, the recording onto the optical disk may be performed with a velocity that is different from that determined by a user using writer software. When the optimum recording velocity is lower than that determined by the user, the recording operation will not end when the expected recording completion time is reached, thus it may lead to a problem in the optical disk device, or it may be mistaken that a personal computer running the writer software to perform recording is hung-up, etc.

Further, when the optimum recording velocity differs from that selected by the user, the expected recording completion time is unclear.

Also, the optical disk device may not allow the user to determine the recording velocity by her/himself by performing several trial recordings. For example, even when the user possesses a number of identical optical disks, the user cannot obtain a limit of recording velocity of such optical disks by carrying out some trial recordings by her/himself.

SUMMARY OF THE INVENTION

Accordingly, it is a general object of the present invention to provide an optical disk recording method and an optical disk device, wherein various aspects of performance of the optical disk can be maximized by performing a more flexible velocity change, and more stable recording at the velocity transition is made possible.

It is another and more specific object of the present invention to provide an information processing method and an information processing device, wherein the user is capable of recognizing that the user-determined recording velocity differs from the actual recording velocity, if that is the case, the user is capable of predicting the expected recording completion time, and further the user is capable of performing a recording trial.

According to the present invention, in order to achieve the above-mentioned objects, there is provided an optical disk recording method comprising steps of a) performing recording with ZCLV method by using zone parameter storage means for storing at least one zone division time and CLV (constant linear velocity) of each zone in a track formed on the optical disk, as zone parameters, for each of a plurality of recording modes and optical disk type determination means for determining the type of the optical disk before recording, b) performing optimization of the recording velocity by detecting, before recording, servo signal fluctuation by accessing the optical disk, by determining a maximum recording velocity defined by a rotational motor rotating the optical disk from the detected result, and by calculating a changing point of the recording velocity, and c) limiting the speed of the rotational motor when the servo signal fluctuation of the optical disk exceeds a reference level and determining the relation between the zone division time and the CLV of each zone.

According to the present invention, after the recording velocity has reached its maximum, the servo signals are quantitatively evaluated while moving toward the outer periphery of the optical disk and when the evaluation value of the servo signal exceeds the reference level, the recording velocity is gradually reduced, maintaining CLV.

According to the present invention, after the recording velocity has reached its maximum, the servo signals are quantitatively evaluated while moving toward the outer periphery of the optical disk and when the servo signal is below a second reference level, the recording velocity is gradually reduced, maintaining CLV.

Further, according to the present invention, there is provided an information processing method employing the above-mentioned recording method, the method comprising steps of a) storing the optimized recording velocity and b) preventing the selection of a recording velocity faster than the stored optimized recording velocity, when selecting recording velocity. Alternatively, the method according to the present invention comprises a step of b) when recording velocity faster than the stored optimized recording velocity is selected, displaying that an optimized recording velocity limitation is activated and changing the selected recording velocity to the stored optimized recording velocity.

The information processing method according to the present invention further comprises a step of selecting validation or invalidation of optimization of the recording velocity.

According to the present invention, there is further provided an optical disk device comprising: zone parameter storage means for storing at least one zone division time and CLV of each zone in a track formed on the optical disk, as zone parameters, for each of a plurality of recording modes; optical disk type determination means for determining the type of the optical disk before recording; servo signal fluctuation detection means for detecting fluctuation of a servo signal; optimization means for optimizing recording velocity before recording, by determining a maximum recording velocity from the servo signal fluctuation detected by the servo signal fluctuation detection means through accessing the optical disk and by calculating a changing point of the recording velocity; and limitation means for limiting the recording velocity when the servo signal fluctuation of the optical disk exceeds a reference level and for determining the relation between the zone division time and the CLV of each zone.

In the optical disk device according to the present invention, the relation between the zone division time and the CLV of each zone is changed by evaluating the servo signal on a higher velocity side at the changing point where the recording velocity is changed between lower recording velocity and higher recording velocity.

In the optical disk device according to the present invention, the recording velocity is gradually reduced to maintain CLV, after the recording velocity has reached the maximum velocity, when the servo signal is below a second reference level as evaluated quantitatively while moving toward the outer periphery of the optical disk.

The information processing device employing the optical disk device according to the present invention comprises a) means for storing an optimized recording velocity, and b) means for preventing the selection of a recording velocity faster than the stored optimized recording velocity, when selecting recording velocity. Alternatively, the device according to the present invention comprises b) means for, when recording velocity faster than the stored optimized recording velocity is selected, displaying that an optimized recording velocity limitation is activated and for changing the selected recording velocity to the stored optimized recording velocity.

The information processing device according to the present invention comprises means for measuring the data transmission rate during recording and means for either providing recording velocity or average recording velocity during recording, or providing average recording velocity, minimum recording velocity, and maximum recording velocity at the end of recording.

The information processing device according to the present invention further comprises means for selecting validation or invalidation of optimization of the recording velocity.

According to the present invention, there is further provided a controller usable in the optical disk device mentioned above, comprising optimization means for optimizing recording velocity before recording, by determining maximum recording velocity from detected servo signal fluctuation detected by servo signal fluctuation detection means through accessing an optical disk, and by calculating a changing point of the recording velocity; and limiting means for limiting the recording velocity when the servo signal fluctuation of the optical disk exceeds a reference level and for determining relation between the zone division time and the CLV of each zone.

BRIEF DESCRIPTION OF THE DRAWINGS

Other objects, advantages, and further features of the present invention will become more apparent as the description proceeds taken in conjunction with the accompanying drawings in which.

DETAILED DESCRIPTION OF THE PREFERRED EMBODIMENTS

In the following, principles and embodiments of the present invention will be described with reference to the accompanying drawings.

Figure 3:
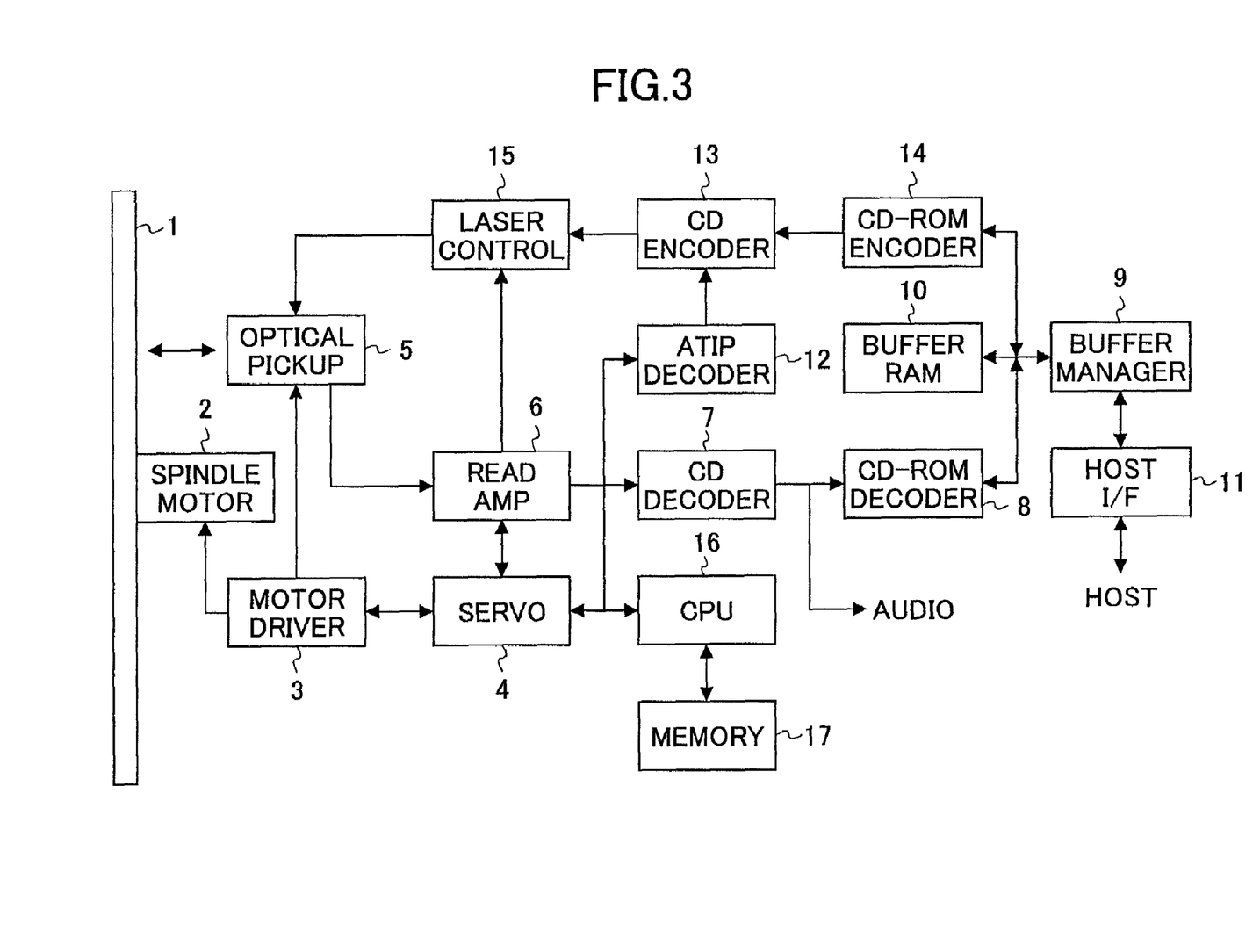
FIG. 3 is a block diagram illustrating the first embodiment of the present invention.

FIG. 3 shows the first embodiment of the present invention. An optical disk device according to the first embodiment of the present invention records data onto/reads data from an optical disk 1 such as a CD-R (CD-Recordable) or CD-RW (CD-Rewritable). The optical disk 1 is rotationally driven by a spindle motor 2, which is a rotational motor, and the spindle motor 2 is controlled by a motor driver 3 and a servo means 4 so that the optical disk 1 rotates so as to provide either ZCLV or CLV.

An optical pickup 5 emanates a laser beam from a laser source such as a laser diode. The laser beam is focused on the recording surface of the optical disk 1 by an objective lens, and focusing and tracking are controlled by an actuator through a focus servo means and a track servo means so as either to obtain a read signal by reading the data recorded on the optical disk 1, or to record data on the optical disk 1.

When reading the data, the read signal obtained by the optical pickup 5 is amplified and digitized in a read amplifier 6, after which de-interleaving and error correction are performed in a CD decoder 7. A CD-ROM decoder 8 performs further error correction to the output data from the CD decoder 7 to enhance the reliability of the data.

The output data from the CD-ROM decoder 8 are temporarily stored in a buffer RAM 10 by a buffer manager 9 and when the data are collected up as sector data, they are transferred to a host (host computer: personal computer) via a host interface (host I/F) 11. In a case of the data being audio data, the output data from the CD decoder 7 are transformed into analog audio signals by a D/A converter (not shown) and retrieved therefrom.

In contrast, when recording data, the data transmitted from the host via the host I/F 11 are temporarily stored in the buffer RAM 10 by the buffer manager 9. Before beginning the data recording, Optimum Power Calibration (OPC) is performed in a trial recording area referred to as Power Calibration Area (PCA) and an optimum recording power is obtained.

The laser optical spot is positioned at a recording start point on the optical disk 1 before beginning the data recording. The recording start point is obtained from an Absolute Time In Pre-groove (ATIP) signal, which can be obtained from wobbles of the track (pre-groove) recorded on the optical disk 1. The ATIP signal presents time information (location information) indicating an absolute address on the optical disk 1, and is retrieved by an ATIP decoder 12 from the output data from the read amplifier 6. At the same time, ATIP signal error is detected and thus a detection error rate of the ATIP signal is measured.

A synchronization signal generated by the ATIP decoder 12 is input into a CD encoder 13 and thus the data can be recorded starting from an accurate position. When recording, the data are read from the buffer RAM 10. An addition of error correction codes and interleaving are performed to the read data in a CD-ROM encoder 14 and the CD encoder 13. The resultant data are recorded on the optical disk 1 via a laser control circuit 15 and the optical pickup 5. A CPU 16 centrally controls each part of the optical disk device and records data into memory 17 and reads out the data therefrom.

In the first embodiment of the present invention, a track on the optical disk 1 in a spiral form is divided into 3 zones at most and either ZCLV recording or CLV recording is performed.

Figure 4:
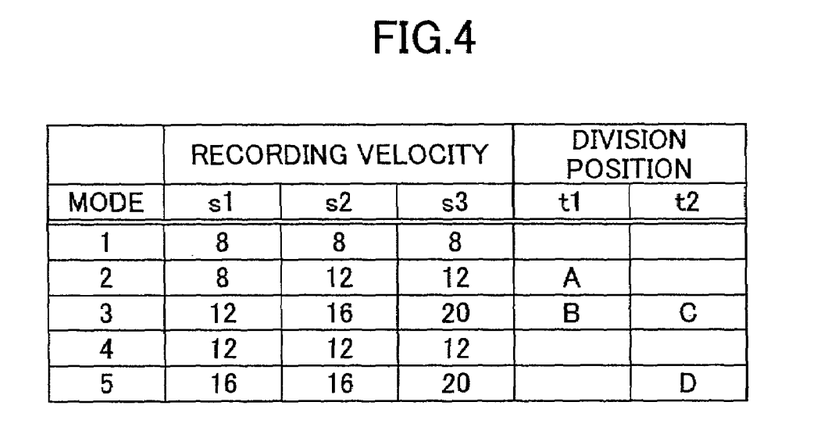
FIG. 4 shows a zone division table according to the first embodiment of the present invention.

FIG. 4 shows a zone division table having 5 recording modes. In the first recording mode 1, there are no zone divisions on the optical disk 1 and the CPU 16 controls each part of the optical disk device according to the first embodiment of the present invention so as to perform CLV recording onto the whole surface of the optical disk 1 at 8x velocity.

In the second recording mode 2, the track on the optical disk 1 is divided into 2 zones; a zone 1 from the innermost periphery to a 5-minute position t1 and a zone 2 from the 5-minute position t1 to the outermost periphery. The CPU 16 controls each part according to the first embodiment of the present invention so as to perform CLV recording at 8x velocity in zone 1 and ZCLV recording at 12x velocity in zone 2.

In the third recording mode 3, the track on the optical disk 1 is divided into 3 zones; a zone 1 from the innermost periphery to a 5-minute position t1, a zone 2 from the 5-minute position t1 to a 30-minute position t2, and a zone 3 from the 30-minute position to the outermost periphery. The CPU 16 controls each part according to the first embodiment of the present invention so as to perform CLV recording at 12x velocity in zone 1, CLV recording at 16x velocity in zone 2, and ZCLV recording at 20x velocity in zone 3.

In the fourth recording mode 4, there are no zone divisions on the optical disk 1 and the CPU 16 controls each part according to the first embodiment of the present invention so as to perform CLV recording onto the whole surface of the optical disk 1 at 12x velocity.

In the fifth recording mode 5, the track on the optical disk 1 is divided into 2 zones; a zone 1 from the innermost periphery to a 15-minute position t1 and a zone 2 from the 15-minute position t1 to the outermost periphery. The CPU 16 controls each part according to the first embodiment of the present invention so as to perform CLV recording at 16x velocity in zone 1 and ZCLV recording at 20x velocity in zone 2.

The table shown in FIG. 4 is stored in the memory 17 and the CPU 16 can read zone division time (track division position) t1, t2 and recording velocity s1, s2, and s3 for respective recording modes from the zone division table in the memory 17.

Figure 5:
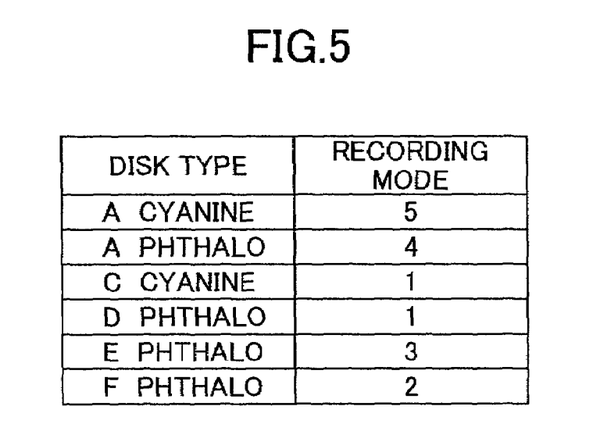
FIG. 5 shows a table comprising a plurality of optical disk types to be used according to the first embodiment of the present invention, and corresponding recording modes, each suited for respective types.

The memory 17 also stores a correspondence table, as shown in FIG Cyanine. 5, representing types of optical disks, for example, a disk from A company, a Phthalo disk from A company, a Cyanine disk from C company, a Phthalo disk from D company, a Phthalo disk from E company, and a Phthalo disk from F company, and the recording modes 1 to 5 suited for each optical disk type. The CPU 16 may read the correspondence table from the memory 17 when necessary. According to the first embodiment of the present invention, the correspondence table as shown in FIG. 5 is created in advance in a designing phase, by experimentally determining an optimum recording mode for each optical disk type through recording evaluation of each recording mode relative to each optical disk type.

Figure 6:
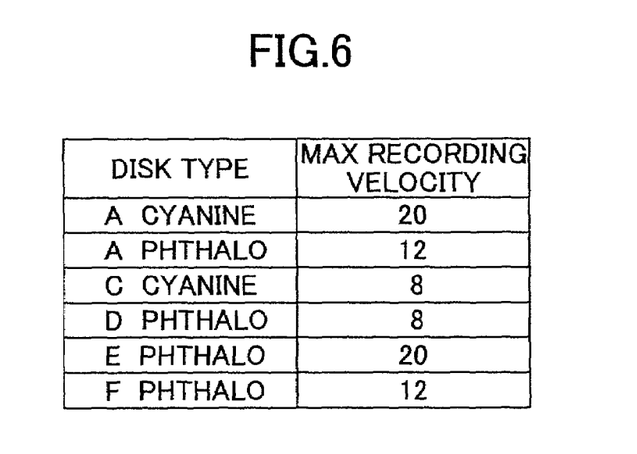
FIG. 6 shows a table describing maximum recording velocity for each type of optical disk.

The CPU 16 controls each part of the first embodiment of the present invention so as to carry out the following operation. When the optical disk 1 is inserted into the optical disk device as in the first embodiment of the present invention (step 100), Read-Toc operation is performed. The ATIP codes in the lead-in area of the optical disk 1 are read by the optical pickup 5 to obtain information such as the name of manufacturer and the type of the optical disk 1. The CPU 16 determines the type of the optical disk 1 from the ATIP signal (ATIP code) output from the ATIP decoder 12 (step 102). Here, it is assumed that the type of the optical disk 1 is the Phthalo disk from E company. The memory 17 stores a table showing maximum recording velocity for each type of the optical disk 1 as shown in FIG. 6. The CPU 16 refers to the table and determines the maximum recording velocity for the relevant optical disk 1.

Since the optical disk 1 is the Phthalo disk from E company as mentioned above, the maximum recording velocity for the relevant optical disk is limited to 20x velocity. By making reference to the zone division table of FIG. 4, it can be seen that, both the ZCLV recording of the third recording mode 3 and the ZCLV recording of the fifth recording mode 5 are selectable since the maximum recording velocity is 20x velocity. Then, by performing the OPC operation with a predetermined recording velocity, for-example 16x velocity, in the trial recording area provided on the innermost periphery of the optical disk 1, the optimum recording power is obtained. This OPC operation is well known, wherein the recording onto the trial area is performed by sequentially increasing the recording power, and then the recorded area is read out to identify the area where the optimum recording was performed and thus determining the optimum recording power.

On the basis of this result (the optimum recording power in 16x velocity), an optimum recording power of 20x velocity is estimated. In this estimation, assuming that the optimum recording-power Pv is obtained at liner velocity v, the optimum recording power Pw(i) with liner velocity V(i) can be obtained from the following equation;

$$Pw(i)=a*(V(i)-v)*Pv+c \quad (1)$$

where a and c are experimental values obtained by evaluating each optical disk type when designing the optical disk device and are stored in the memory 17. The CPU 16 calculates the optimum recording power Pw(i) of 20x velocity by applying the equation (1) to the optimum recording power of 16x velocity and checks if the calculated optimum recording power Pw(i) of 20x velocity exceeds maximum laser power (maximum output power of the laser source used in the optical pickup 5) or not.

When the optimum recording power Pw(i) of 20x velocity exceeds the maximum laser power, the CPU 16 limits the optimum recording power Pw(i) of 20x velocity so that it is below the maximum laser power. When the optimum recording power Pw(i) of 16x velocity exceeds the maximum laser power, the CPU 16 limits the recording velocity to 12x velocity and performs again the OPC operation with CLV of 12x velocity in the trial recording area, thus obtaining the optimum recording power of 12x velocity. As a result, the CPU 16 selects the ZCLV recording of the third recording mode 3 by making reference to the zone division table shown in FIG. 4 (step 104). Then, the CPU 16 checks servo track-ability and depending on the result, limits the maximum number of revolutions per minute (recording velocity) of the spindle motor 2 (step 106). Depending on the maximum number of revolutions per minute, the CPU 16 calculates a zone division position such as B, C, or D (step 108).

According to the first embodiment of the present invention, in order to check if the servo track-ability is acceptable or not, the servo signals are actually monitored. In other words, servo signal fluctuation detection means monitors the focus error signals and the track error signals and determines that the servo track-ability is unacceptable when the amplitude of both signals exceeds a predetermined value. This servo signal fluctuation detection means comprises a servo signal monitoring function included in the servo means 4 and the CPU 16 monitors the output signals from the servo signal monitoring function when necessary.

Figure 7:
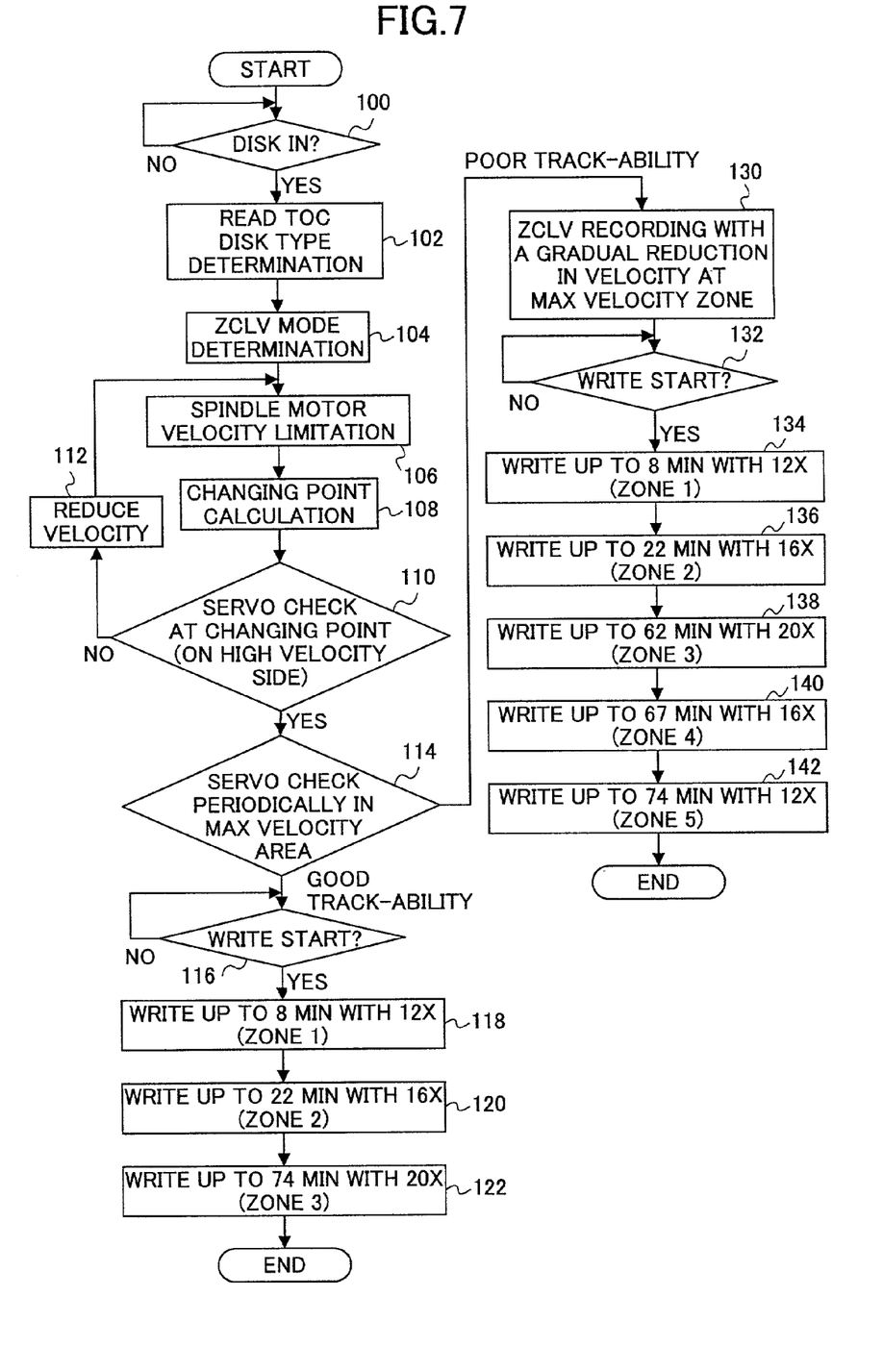
FIG. 7 is a flow chart of operational flow of the first embodiment of the present invention.
Figure 8:
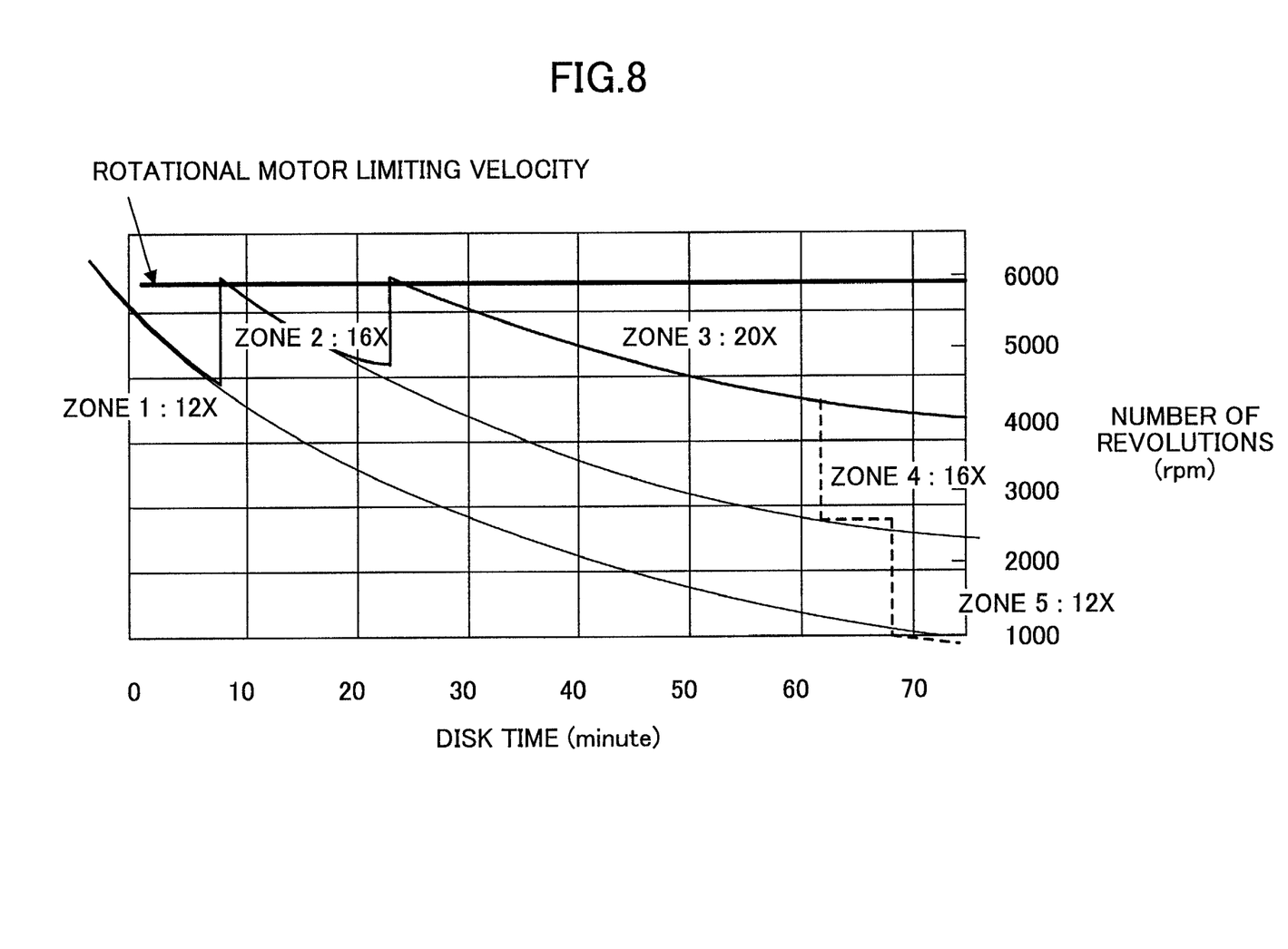
FIG. 8 is a diagram illustrating zone maximum recording velocities and speed of a spindle motor according to the first embodiment of the present invention.

FIG. 7 is a flow chart of the operational flow according to the first embodiment of the present invention and FIG. 8 shows rotational speed of the spindle motor 2. As mentioned above, the third recording mode 3 is selected, thus ZCLV recording of 20x velocity at the maximum is performed. Then the CPU 16 checks the servo signal fluctuation with respect to the whole surface of the optical disk 1 from detected result of the servo signal fluctuation detection means (checks if the servo signal fluctuation is acceptable), determines limiting speed of the spindle motor 2 (limiting speed of the rotational motor as shown in FIG. 8), and calculates a changing point of each zone so that the speed of the spindle motor 2 does not exceed its limiting speed. It is assumed that zone 1 is from the 0-minute position to the 8-minute position (division time B: 8 minutes), zone 2 is from the 8-minute position to the 22-minute position (division time C: 22 minutes), and zone 3 is from the 22-minute position to the 74-minute position.

The CPU 16 further checks the servo signal fluctuation from the detected result of the servo signal fluctuation detection means at the changing point for the purpose of accuracy (step 110). The CPU 16 reduces the speed of the spindle motor 2 when the servo signal fluctuation is unacceptable (step 112) and again, checks the servo signal fluctuation with respect to the whole surface of the optical disk 1 as mentioned above, determines the limiting speed of the spindle motor 2 (limiting the speed of the rotational motor as shown in FIG. 8), and calculates a changing point of each zone so that the speed of the spindle motor 2 does not exceed its limiting speed.

Then, in the maximum velocity area of the optical disk 1, the CPU 16 checks, at a predetermined time intervals such as 5 minutes, the servo signal fluctuation from the detected result of the servo signal fluctuation detection means (step 114). In other words, as shown in FIG. 8, the CPU 16 checks (evaluates), every 5 minutes, the servo signal from the detected result of the servo signal fluctuation detection means from the 22-minute position on the optical disk 1 toward the outer periphery.

When the CPU 16 finds, at the 62-minute position, that the servo track-ability is unacceptable since the servo signal fluctuation at this position is below a reference level, the CPU 16 reduces the recording velocity to 16x velocity from 20x velocity and determines the area from the 22-minute position to the 62-minute position as zone 3. When the CPU 16 finds, at the 67-minute position which is farther out toward the outer periphery, that the servo signal fluctuation has become more prominent and thus the servo track-ability is even more unacceptable, the CPU 16 reduces the recording velocity to 12x velocity from 16x velocity, and determines the area from the 62-minute position to the 67-minute position as zone 4 and the area from the 67-minute position to the 74-minute position as zone 5.

When there is no servo signal fluctuation and the servo track-ability is acceptable at the maximum velocity area, the CPU 16 controls each part according to the first embodiment of the present invention so as to perform the usual ZCLV recording as shown in the bottom-left section of FIG. 7 (steps 116 through 122). When the recording begins, CLV recording is performed at 12x velocity in the zone 1 up to the 8-minute position where the recording is interrupted using the known technique described in JPA No. 10-19990, ensuring the continuity of the data (step 118). Then, the CLV is increased to 16x velocity and the CLV recording is resumed using the known technique described in JPA No. 10-19990, ensuring the continuity of the data. The CLV recording of zone 2 is accomplished by performing CLV recording from the 8-minute position up to the 22-minute position where the recording is interrupted using the known technique described in JPA No. 10-19990, ensuring the continuity of the data (step 120). Finally, the CLV recording of zone 3 is accomplished by increasing the CLV to 20x velocity, resuming CLV recording using the known technique described in JPA No. 10-19990, ensuring the continuity of the data, and by performing CLV recording from the 22-minute position up to the final position (step 122).

When there is servo signal fluctuation and the servo track-ability is unacceptable in the maximum velocity area, the CPU 16 selects the ZCLV recording that reduces the recording velocity in the outer periphery of the maximum velocity zone as shown in the bottom-right section of FIG. 7 (steps 130 through 142) and controls each part according the first embodiment of the present invention so as to perform ZCLV recording onto zones 1 through 5 as mentioned in the following. In other words, when the recording begins (step 132), CLV recording is performed at 12x velocity in zone 1 up to the 8-minute position where the recording is interrupted using the known technique described in JPA No. 10-19990, ensuring the continuity of the data (step 134).

The CLV recording of zone 2 is accomplished by increasing the CLV to 16x velocity, by resuming CLV recording using the known technique described in JPA No. 10-19990, ensuring the continuity of the data, and by performing CLV recording from the 8-minute position up to the 22-minute position where the recording is interrupted using the known technique described in JPA No. 10-19990, ensuring the continuity of the data (step 136).

Then CLV recording of zone 3 is accomplished by increasing the CLV to 20x velocity, by resuming CLV recording using the known technique described in JPA No. 10-19990, ensuring the continuity of the data, and by performing CLV recording from the 22-minute position up to the 62-minute position where the recording is interrupted using the known technique described in JPA No. 10-19990, ensuring the continuity of the data (step 138).

Then CLV recording of zone 4 is accomplished by reducing the CLV to 16x velocity, by resuming CLV recording using the known technique described in JPA No. 10-19990, ensuring the continuity of the data, and by performing CLV recording from the 62-minute position up to the 67-minute position where the recording is interrupted using the known technique described in JPA No. 10-19990, ensuring the continuity of the data (step 140). Then the CLV recording of zone 5 is accomplished by reducing the CLV to 12x velocity, by resuming CLV recording using the known technique described in JPA No. 10-19990, ensuring the continuity of the data, and by performing CLV recording from the 67-minute position up to the 74-minute position (step 142).

The first embodiment of the present invention operates in a similar way when the type of the optical disk 1 differs from the Phthalo disk from A company as mentioned above.

According to the first embodiment of the present invention, there is provided an optical disk device comprising a memory 17 as zone parameter storage means that stores at least one zone division time and CLV for respective zones, as zone parameters, for respective recording modes among a plurality of recording modes, a CPU 16 as an optical disk type determination means determining the type of the optical disk 1 before recording, and a servo signal fluctuation detection means detecting servo signal fluctuation. The optical disk device according to the present invention further comprises optimization means for optimizing recording velocity before recording, by determining maximum recording velocity from servo signal fluctuation detected by servo signal fluctuation detection means through accessing an optical disk, and by calculating a changing point of the recording velocity. The optical disk device according to the present invention further comprises limiting means for limiting the recording velocity when the servo signal fluctuation of the optical disk exceeds a reference level and for determining relation between the zone division time and the CLV of each zone. The optimization means and the limiting means may be embodied as a controller usable in the above-mentioned optical disk device. Therefore, it is possible to determine zones for ZCLV recording depending on mechanical property and recording power property for each type of optical disk, and thus the performance of the various optical disks can be maximized by performing more flexible velocity changes. For example, reducing the recording velocity at the outer periphery of the optical disk and increasing the recording velocity at the intermediate periphery of the optical disk may be possible. Consequently, high-speed recording without the risk of track deviation is realized.

In addition, according to the first embodiment of the present invention, the relation between the zone division time and the CLV of the respective zones is changed by evaluating the servo signal on the higher velocity side at the changing point, where the recording velocity is changed from the lower velocity to the higher velocity. Thus more stable recording can be performed at the velocity changing point even when various optical disk devices and optical disks are used. This is because when comparing low recording velocity and high recording velocity, acquisition of a stable servo signal is more difficult in the latter. Consequently, high-speed recording with even higher reliability without the risk of track deviation is realized.

Further, according to the first embodiment of the present invention, after the recording velocity has reached the maximum, the servo signals are evaluated quantitatively while moving toward the outer periphery of the optical disk. The speed of the spindle motor is gradually reduced when the servo signal is below the reference level to maintain CLV. Thus, the performance of the various optical disks is maximized by a more flexible velocity change as mentioned above.

Figure 9:
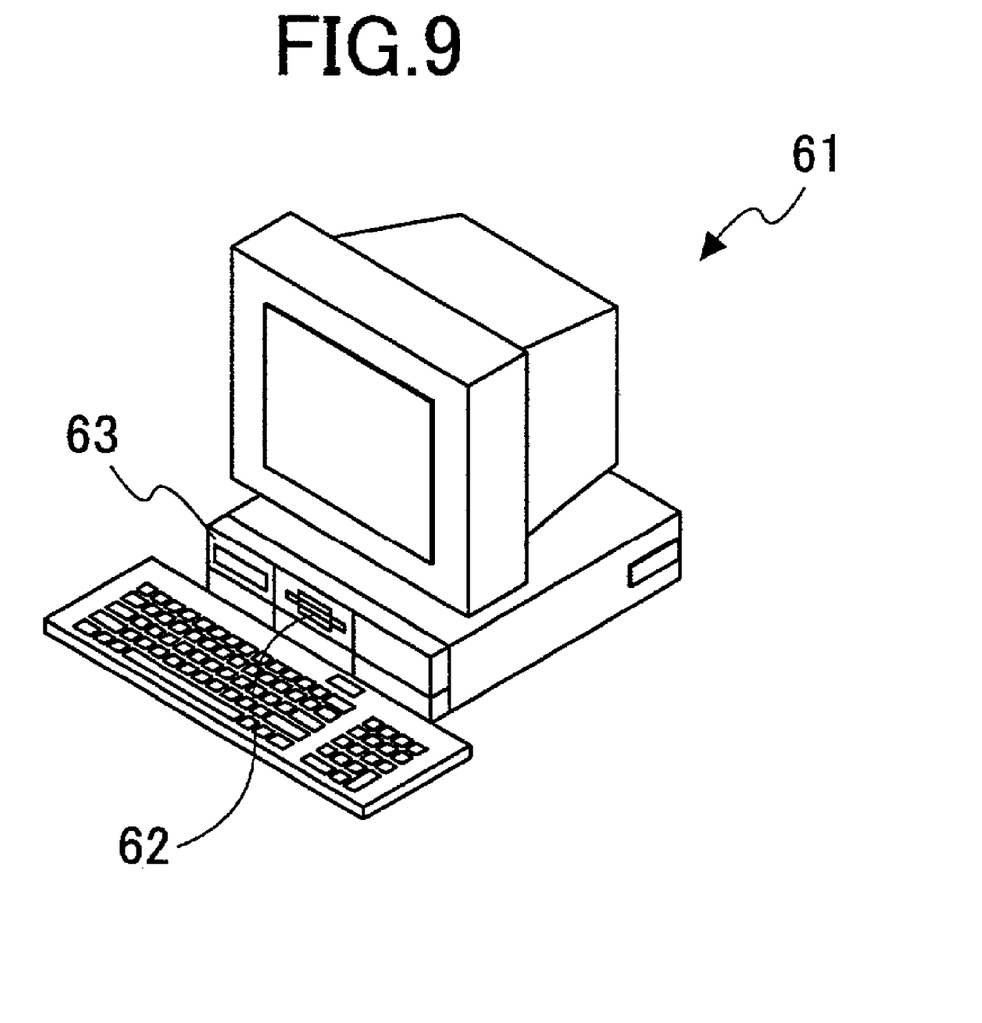
FIG. 9 schematically shows the second embodiment of the present invention.
Figure 10:
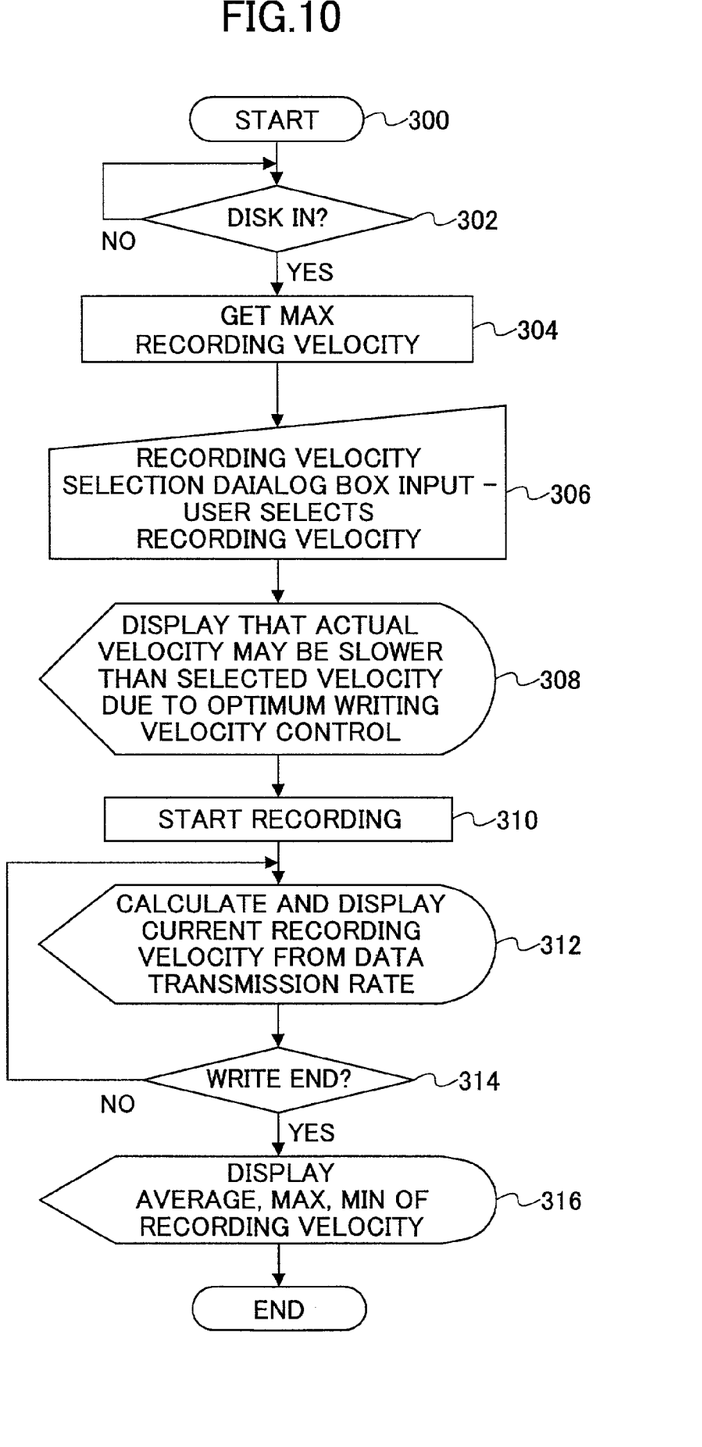
FIG. 10 is a flow chart of operational flow according to the second embodiment of the present invention.

A description of the second embodiment of the present invention is given in the following with reference to FIG. 9. In the second embodiment of the present invention, the optical disk device of the first embodiment is applied to a personal computer 61, i.e. an information processing device. The information processing device is provided with a 3.5 FD drive device 62 and is arranged to integrate the above-mentioned optical disk device 63 as a CD-R drive (either a integrally constructed type or a built-in type). The personal computer serving as a host, making the optical disk device record data onto the optical disk 1 using writer software. According to such personal computer 61, since the above-mentioned optical disk device 63 is integrated, it is possible to provide the personal computer 61 wherein the optical disk device 63 can be used as a storage device and the like. However, it is noted that the optical disk device is not necessarily be integrated in the personal computer and it may be provided as a separate component connected to the information processing device. Further, the personal computer 61 is not limited to a desktop type but it may be a portable type such as a notebook computer. In the information processing device according to the second embodiment of the present invention, ZCLV recording is performed as in the following by writer software running on the host. FIG. 10 is a flow chart describing operational flow according to the second embodiment of the present invention. The CPU 16 controls each part of the operational flow as shown in FIG. 10 according to the second embodiment.

When the optical disk 1 is inserted into the optical disk device of the present invention (step 302), Read-Toc operation is carried out. The ATIP code in the lead-in area of the optical disk 1 are read and the CPU 16 provides maximum recording velocity obtained from the ATIP code output from the ATIP decoder 12 to the host (the writer software) (step 304). The host inquires of the user, using the writer software, the recording velocity of the optical disk 1 through a dialog box, etc. (step 306). At this point, the host prevents the user from selecting, using the writer software, a recording velocity faster than the maximum recording velocity provided from the CPU 16. Alternatively, the host presents all possible selections of recording velocity and when the user selects a recording velocity faster than the recording velocity provided by the CPU 16, then a message is given to the user saying that the recording velocity is limited to the maximum recording velocity provided by the CPU 16 and the host changes the user-selected recording velocity to the recording velocity provided by the CPU 16.

Just before the recording takes place (step 310), the host draws the attention of the user by presenting a message via the writer software that the actual recording velocity may be slower than that selected by the user since the optimum recording velocity control may be activated (step 308). The host calculates the recording velocity from the data transmission rate during recording using the writer software and presents it to the user as needed (step 312). At the end of the data recording, the host informs the user through the writer software of the actual recording velocity by calculating and presenting an average, a minimum, and a maximum of the recording velocity (average recording velocity, minimum recording velocity, and maximum recording velocity). The user can make use of this information when selecting the recording velocity next time (step 316).

In addition, the optical disk device further comprises a function of switching ON/OFF the optimum recording velocity control as mentioned above. This function switches ON/OFF the optimum recording velocity control by an ON/OFF command (such as a vendor unique command of mode selection, etc.) sent from the host through the writer software. The host enables ON/OFF of the optimum recording velocity control through a set menu of the writer software. When the optimum recording velocity control is switched ON, the CPU 16 operates as mentioned above, and when the optimum recording velocity control is switched OFF, the CPU 16 performs ZCLV recording with recording velocity determined independently according to the type of the optical disk 1.

According to the second embodiment of the present invention, there is provided means for informing the host or the writer software of the optimized recording velocity. Taking the provided optimized recording velocity into consideration, the host or the writer software prevents the selection of a recording velocity faster than the provided optimized recording velocity when determining the recording velocity. Alternatively, when a recording velocity faster than the provided optimized recording velocity is selected, the host or the writer software presents a message to the user that the optimum recording velocity limitation is activated and the selected recording velocity is changed to the provided optimized recording velocity. Therefore, the user can recognize that the recording velocity selected by him/herself differs from the actual recording velocity.

According to the second embodiment of the present invention, the host or the writer software has means for measuring the data transmission rate during recording and means for either reporting the recording velocity or average recording velocity during recording, or reporting the average recording velocity, the minimum recording velocity, or the maximum recording velocity when the recording is completed. Therefore, the user is provided with the actual recording velocity and thus can predict the recording completion time.

Also, according to the second embodiment, the host or the writer software has means for selecting validation or invalidation of optimization of the recording velocity. Thus the user can perform experimental recording trials.

Further, the present invention is not limited to these embodiments, and variations and modifications may be made without departing from the scope of the present invention.

The present application is based on Japanese priority application No. 2001-181199 filed on Jun. 15, 2001 the entire contents of which are hereby incorporated by reference.

What is claimed is:

1. An optical disk recording method comprising the steps of:
  a) performing recording onto an optical disk with a ZCLV method by using zone parameter storage means for storing at least one zone division time and CLV of each zone in a track formed on the optical disk, as zone parameters, for each of a plurality of recording modes and optical disk type determination means for determining a type of the optical disk before recording;
b) performing optimization of recording velocity by detecting, before recording, servo signal fluctuation by accessing the optical disk, by determining a maximum recording velocity defined by a speed of a rotational motor rotating the optical disk, and by calculating a changing point of the recording velocity; and
c) limiting the speed of the rotational motor when the servo signal fluctuation exceeds a reference level and determining relation between the zone division time and the CLV of each zone.

2. The method as claimed in claim 1, said method further comprising a step of changing the relation between the zone division time and the CLV of each zone by evaluating the servo signal on a higher velocity side at the changing point where the recording velocity is changed from a lower recording velocity to a higher recording velocity.

3. The method as claimed in claim 1, said method further comprising a step of gradually reducing the recording velocity, after the recording velocity has reached the maximum recording velocity, when the servo signal is below a second reference level as evaluated quantitatively while moving toward an outer periphery of the optical disk.

4. An information processing method employing the optical disk recording method as claimed in any one of claims 1 through 3, said method comprising the steps of:
a) storing an optimized recording velocity; and
b) preventing the selection of, when selecting the recording velocity, recording velocity faster than the stored optimized recording velocity.

5. An information processing method employing the optical disk recording method as claimed any one of claims 1 through 3, said method comprising the steps of:
a) storing an optimized recording velocity; and
b) when recording velocity faster than the stored optimized recording velocity is selected, displaying that an optimized recording velocity limitation is activated and changing the selected recording velocity to the stored optimized recording velocity.

6. The method as claimed in claim 4, said method further comprising a step of selecting validation or invalidation of optimization of the recording velocity.

7. The method as claimed in claim 5, said method further comprising a step of selecting validation or invalidation of optimization of the recording velocity.

8. An optical disk device comprising:
a) zone parameter storage means for storing at least one zone division time and CLV of each zone in a track formed on an optical disk, as zone parameters, for each of a plurality of recording modes;
b) optical disk type determination means for determining a type of the optical disk before recording;
c) servo signal fluctuation detection means for detecting fluctuation of a servo signal;
d) optimization means for optimizing recording velocity before recording, by determining maximum recording velocity from servo signal fluctuation detected by the servo signal fluctuation detection means through accessing the optical disk, and by calculating a changing point of the recording velocity; and
e) limiting means for limiting the recording velocity when the servo signal fluctuation of the optical disk exceeds a reference level and for determining relation between the zone division time and the CLV of each zone.

9. The device as claimed in claim 8, wherein the relation between the zone division time and the CLV of each zone is changed by evaluating the servo signal on a higher velocity side at the changing point where the recording velocity is changed from a lower recording velocity to a higher recording velocity.

10. The device as claimed in claim 8, wherein the recording velocity is gradually reduced, after the recording velocity has reached the maximum velocity, when the servo signal is below a second reference level as evaluated quantitatively while moving toward an outer periphery of the optical disk.

11. An information processing device employing the optical disk device as claimed in any one of claims 8 through 10, said device comprising:
means for storing an optimized recording velocity, and
means for preventing the selection of, when selecting the recording velocity, recording velocity faster than the stored optimized recording velocity.

12. An information processing device employing the optical disk device as claimed in any one of claims 8 through 10, said device comprising:
means for storing an optimized recording velocity, and
means for, when recording velocity faster than the stored optimized recording velocity is selected, displaying that an optimized recording velocity limitation is activated and changing the selected recording velocity to the stored optimized recording velocity.

13. The device as claimed in claim 11, said device further comprising:
means for measuring data transmission rate during recording; and
means for either providing recording velocity or average recording velocity during recording, or providing average recording velocity, minimum recording velocity, and maximum recording velocity at an end of recording.

14. The device as claimed in claim 12, said device further comprising:
means for measuring data transmission rate during recording; and
means for either providing recording velocity or average recording velocity during recording, or providing average recording velocity, minimum recording velocity, and maximum recording velocity at an end of recording.

15. The device as claimed in claim 13, said device further comprising:
means for selecting validation or invalidation of optimization of the recording velocity.

16. The device as claimed in claim 14, said device further comprising:
means for selecting validation or invalidation of optimization of the recording velocity.

17. A controller usable in the optical disk device as claimed in any one of claims 8 through 10, comprising:
d) optimization means for optimizing recording velocity before recording, by determining maximum recording velocity from servo signal fluctuation detected by servo signal fluctuation detection means through accessing an optical disk, and by calculating a changing point of the recording velocity; and
e) limiting means for limiting the recording velocity when the servo signal fluctuation of the optical disk exceeds a reference level and for determining relation between the zone division time and the CLV of each zone.

* * * * *